United States Patent [19]

Frank et al.

[11] 4,303,567

[45] Dec. 1, 1981

[54] PROCESS FOR THE PRODUCTION OF THINLAYER POLYESTER COATINGS

[75] Inventors: Walter Frank; Otto Bendszus; Hansjoachim Freier; Hans-Joachim Traenckner, all of Krefeld, Fed. Rep. of Germany

[73] Assignee: Bayer Aktiengesellschaft, Fed. Rep. of Germany

[21] Appl. No.: 156,552

[22] Filed: Jun. 5, 1980

[30] Foreign Application Priority Data

Jun. 8, 1979 [DE] Fed. Rep. of Germany ....... 2923338

[51] Int. Cl.$^3$ .................... C08J 3/00; C08L 00/00; C08K 00/00
[52] U.S. Cl. ................. 260/29.2 UA; 260/29.2 N; 260/29.2 E; 260/28.5 R; 260/29.6 NR; 525/444
[58] Field of Search .................. 260/29.2 UA, 29.2 N, 260/29.2 E, 28.5 R, 29.6 NR; 525/444; 528/274, 303

[56] References Cited

U.S. PATENT DOCUMENTS 4,077,931  3/1978  Leitheiser et al. .......... 260/29.6 NR
4,233,194  11/1980  Eschwey et al. ........ 260/29.2 UA X
4,259,219  3/1981  Eschwey et al. .......... 260/29.2 N X

FOREIGN PATENT DOCUMENTS 1076319  7/1967  United Kingdom .

*Primary Examiner*—Lucille M. Phynes
*Attorney, Agent, or Firm*—Connolly and Hutz

[57] ABSTRACT

Monomer-free aqueous dispersions of air-drying unsaturated polyesters can be hardened to thin coatings in the presence of accelerators, but in the absence of common initiators, if the chemical structure of the polyester meets specific requirements.

6 Claims, No Drawings

PROCESS FOR THE PRODUCTION OF THINLAYER POLYESTER COATINGS

This invention relates to a process for the production of thin-layer coatings by polymerising aqueous monomer-free dispersion films based on air-drying unsaturated polyesters in the presence of accelerators but in the absence of standard external polymerisation initiators.

Hitherto, the starting materials used for coatings based on unsaturated polyesters have generally been unsaturated polyester resins, i.e. mixtures of $\alpha,\beta$-ethylenically unsaturated polyesters and monomers copolymerisable therewith.

The styrene almost exclusively used as monomer in lacquers of the type in question copolymerises with the unsaturated polyesters during hardening of the film so that, by comparison with nitrolacquer coatings, cross-linked, i.e. insoluble, lacquers of high utility value are formed. However, evaporation losses of monomeric styrene during processing, for example in the coating machine and at the beginning of the film hardening process, are unavoidable. Their removal from the waste air of the workshops and drying installations is extremely expensive on account of the large quantities of air which have to be circulated.

Numerous compounds have been proposed for initiating the polymerisation reaction, their effect being that, on the application of energy by heating or irradiation, they decompose into reactive radicals which in turn initiate polymerisation as a radical chain reaction. The most common polymerisation initiators are compounds containing a peroxide group. Their advantage is that they can be made to decompose spontaneously at temperatures as low as room temperature by so-called accelerators such as, for example, certain metal compounds of tertiary aromatic amines.

The processing the peroxides entails problems from the physiological point of view with the result that their handling requires strick safety measures. Photoinitiators free from peroxide groups are less problematical in terms of irritation of the skin and the danger of explosions. However, their use involves considerable technical outlay on account of the irradiation apparatus required.

An object of the present invention is to provide a process for the production of coatings based on aqueous dispersions of unsaturated polyesters for particularly thin coatings on wood, wood-like materials or wood imitations which does not have any of the disadvantages referred to above.

It has now surprisingly been found that monomerfree aqueous dispersions of special air-drying unsaturated polyesters can be hardened in the presence of accelerators, but in the absence of standard initiators to form thin coatings.

Accordingly, the present invention provides a process for the production of thin-layer coatings which is characterised in that monomer-free aqueous dispersions of at least one $\alpha,\beta$-ethlenically unsaturated polyester containing from 0.2 to 0.8 mole of $\beta,\gamma$-ethylenically unsaturated ether groups per 100 g of polyester are polymerised in the presence of accelerators, but in the absence of standard external polymerisation initiators.

In the context of the invention, the expression "monomer-free" means free from monomers which would be copolymerisable with the unsaturated polyesters.

"Standard external polymerisation initiators" are understood to be those compounds which are added for the purpose of initiating polymerisation. Standard external polymerisation initiators are described in Wagner/Sarx, Lackkunstharze, Chapter: Ungesattigte Polyesterharze (Unsaturated Polyester Resins), 5th Edition, Carl Hanser Verlag, Stuttgart, 1971. Examples of standard external polymerisation initiators are diacyl peroxides, such as diacetyl peroxide, dibenzoyl peroxide, di-p-chlorobenzoyl peroxide, t-butyl peroxide, peroxyesters, such as t-butyl peroxyacetate, t-butyl peroxybenzoate, t-butyl peroctoate, dicyclohexyl peroxydicarbonate or 2,5-dimethyl hexane-2,5-diperoctoate, alkyl peroxides, such as bis-(t-butyl peroxybutane), dicumyl peroxide, t-butyl cumyl peroxide, hydroperoxides, such as cumene hydroperoxide, t-butyl hydroperoxide, cyclohexanone hydroperoxide, methyl ethyl ketone hydroperoxide, perketals, acetyl acetone peroxide, azoisobutyrodinitrile and hydrogen peroxide; photoinitiators, such as benzoins and benzoin ethers, 1,1,2,2-tetra-aryl-1,2-dihydroxy ethanes, their alkyl and silyl ethers (German Auslegeschrifts Nos. 1,216,877 and 1,219,224; German Offenlegungsschrifts Nos. 2,131,623 and 2,164,482), and also photoinitiators of the 1,2-diaryl-1,2-dicyano-1,2-dihalogen ethane type (German Offenlegungsschrift No. 2,444,252), the 1,2-diaryl-1,1,2,2-tetracarbalkoxy ethane type (U.S. Pat. No. 3,896,099) and the 1,2-diaryl-1,1,2,2-tetramethyl ethane type containing partially chlorinated methyl groups (Belgian Pat. No. 834,599).

It may presumably be assumed that peroxides formed by the action of atmospheric oxygen on the activated methylene group of the $\beta,\gamma$-ethylenically unsaturated ether groups of the polyester play an important part in the polymerisation of the polyester although, with other polyester systems, reactions such as these have never resulted in hardening. These "internal" polymerisation initiators, in contrast to the external polymerisation initiators, are intended to be present during the process according to the invention.

The process according to the invention avoids the disturbances affecting the levelling of the lacquer film formed which are so difficult to control in the case of aqueous emulsions and, since organic solvents and monomers do not need to be evaporated, enables thin-layer coatings to be more conveniently prepared. The lacquer films have satisfactory flow properties, even when applied in quantities designed to produce dry film layer thicknesses of 10 $\mu$m.

It is obvious that the absence of peroxidic initiators affords a significant advantage.

However, it is surprising and could not have been foreseen, even by the expert, that unsaturated polyesters can be hardened by the process according to the invention in the absence of external initiators to form coatings having excellent properties in an unforeseeably short time.

Preferred water-dispersible polyesters, hereinafter referred to in short as polyester a, are the polycondensation products of at least one $\alpha,\beta$-ethylenically unsaturated dicarboxylic acid generally containing 4 or 5 carbon atoms or ester-forming derivatives (for example anhydrides) thereof, optionally in admixture with up to 200 mole percent, based on the unsaturated acid component, of at least one aliphatic saturated dicarboxylic acid containing from 4 to 10 carbon atoms or cycloaliphatic or aromatic dicarboxylic acid containing from 8 to 10 carbon atoms or ester-forming derivatives thereof (for example their anhydrides), with at least one hydroxy compound, preferably a dihydroxy or polyhydroxy compound containing from 2 to 8 carbon atoms of which the OH- groups which are not used for polycondensation are at least partly etherified with $\beta,\gamma$-unsaturated alcohols, i.e. polyesters of the type described, for example, in German Auslegeschrift No. 1,024,654.

Examples of preferred unsaturated dicarboxylic acids or their derivatives are maleic acid or maleic acid anhydride and fumaric acid. However, it is also possible to use, for example, mesaconic acid, citraconic acid, itaconic acid or chloromaleic acid. Examples of the aliphatic saturated and cycloaliphatic and aromatic dicarboxylic acids or their derivatives which may be used in accordance with the invention are phthalic acid or phthalic acid anhydride isophthalic acid, terephthalic acid, hexahydro- or tetrahydro-phthalic acid or their anhydrides, endomethylene tetrahydrophthalic acid or its anhydride, succinic acid or succinic acid anhydride and succinic acid esters and chlorides, adipic acid and sebacic acid. In order to produce flame-resistant resins, it is possible to use, for example, hexachloro-endomethylene tetrahydrophthalic acid, tetrachlorophthalic acid or tetrabromophthalic acid. Suitable dihydric alcohols are ethylene glycol, 1,2-propane diol, 1,3-propane diol, diethylene glycol, dipropylene glycol, 1,3-butane diol, 1,4-butane diol, neopentyl glycol, 1,6-hexane diol, 2,2-bis(4-hydroxy cyclohexyl)-propane and bis-alkoxylated bisphenol A. Hydroxy compounds preferably used for introducing the $\beta,\gamma$-ethylenically unsaturated ether groups are trimethylol propane monoallyl and diallyl ether, glycerol monoallyl and diallyl ether and pentaerythritol monoallyl, diallyl and triallyl ether.

In order to render the $\alpha,\beta$-ethylenically unsaturated polyesters dispersible in water, polyalkylene glycol residues and, preferably, polyethylene glycol residues having molecular weights of from 250 to 2000 may be co-condensed with the polyesters. This may be done in conventional manner either by using polyalkylene glycols as co-starting compounds in the production of the polyesters or by adding the corresponding alkylene oxides with a polyester preliminary stage in accordance with British Pat. No. 1,076,319. To render the polyester dispersible in water, it is also possible to co-condense mixed polyalkylene glycol residues such as, for example, polyethylene/propylene glycol residues containing less than 50 mole percent of propylene oxide units, based on the polyethylene propylene glycol. Preferred polyalkylene glycols are those in which the ether oxygen atoms are separated by at least two and preferably by two to four carbon atoms. Apart from the nature of the other polyester components, by polyalkylene glycol content required to ensure dispersibility in water is primarily determined by the type and quantity of additionally used dispersants, if any. In general, the polyalkylene glycol content of the polyester is less than 25% by weight and preferably from 5 to 20% by weight, based on polyester.

In one preferred embodiment of the process according to the invention, a second polyester, hereinafter referred to in short as polyester b, is used as a dispersant for rendering polyester a dispersible in water. The dispersant effect of polyester b may be achieved, for example, through co-condensed polyalkylene glycol residues.

Preferred mixture of polyesters a and polyesters b consist of (a) from 50 to 95% by weight, based on the sum of a and b, of at least one $\alpha,\beta$-ethylenically unsaturated polyester containing from 0.2 to 0.8 mole of $\beta,\gamma$-ethylenically unsaturated ether groups per 100 g of polyester a, but no co-condensed polyalkylene glycol residues having molecular weights of from 250 to 2000, and (b) from 5 to 50% by weight, based on the sum of a and b, of at least one $\alpha,\gamma$-ethylenically unsaturated polyester of which from 25 to 90% by weight, based on b, consists of co-condensed polyalkylene glycol residues having a molecular weight of from 250 to 2000 and which contains from 0.4 to 0.5 mole of $\beta,\gamma$-ethylenically unsaturated ether groups per 100 g of polyester b, or of (a) from 50 to 95% by weight, based on the sum of a and b, of at least one $\alpha,\beta$-ethylenically unsaturated polyester containing from 0.2 to 0.8 mole of $\beta,\gamma$-ethylenically unsaturated ether groups per 100 g of polyester a, but no co-condensed polyalkylene glycol residues having a molecular weight of from 250 to 2000, and (b) from 5 to 50% by weight, based on the sum of a and b, of at least one $\alpha,\beta$-ethylenically unsaturated polyester of which from 25 to 90% by weight, based on b, consists of co-condensed polyalkylene glycol residues having a molecular weight of from 250 to 2000 and which contains per 100 g of polyester b from 0.02 to 0.2 mole of saturated aliphatic terminal groups formed by residues of monocarboxylic acids and/or monofunctional alcohols.

Saturated aliphatic monofunctional alcohols preferably used for the production of polyester b are alkanols, cycloalkanols and cycloalkane alcohols, for example n-hexanol, n-octanol, n-decanol, laurol, stearyl alcohol, hexahydrobenzyl alcohol, preferably branched alkanols, such as 2-ethyl-1-hexanol, and isononanols. Preferred saturated aliphatic monocarboxylic acids are n-octanoic acid, n-dodecanoic acid, stearic acid, preferably 2-ethyl hexanoic acid and isononanoic acid. Preferred polyhydroxy compounds are the diols mentioned above in connection with the production of polyester a, for example, ethylene glycol, diethylene glycol, 1,2- and 1,3-propane diol, 1,3-and 1,4-butane diol, 2-ethyl-1,3-propane diol and 1,6-hexane diol. Higher polyhydroxy compounds may only be used in small quantities on account of their branching effect. In this context, "aliphatic" includes "cycloaliphatic".

The polyester generally have acid numbers of from 1 to 40, preferably from 10 to 30, OH numbers of from 10 to 100, preferably from 20 to 50, and molecular weights determined as number averages of from 300 to 5000 and preferably from 500 to 2000.

In order to protect the emulsions according to the invention against undesirable premature polymerisation, it is advisable to add from 0.001 to 0.1% by weight, based on polyester a, of polymerisation inhibitors or oxidation inhibitors during the actual production of the unsaturated polyesters.

Preferred auxiliaries of this type are, for example, phenol and phenol derivatives, preferably sterically hindered phenols containing $C_1$-$C_6$ alkyl substituents in both o-positions to the phenolic hydroxy group, amines, preferably secondary aryl amines and their derivatives, quinones, copper salts of organic acids, addition compounds of copper(I)-halides with phosphites; and compounds of the type also described in "Methoden der organischen Chemie" (Houben-Weyl), 4th Edition, Vol. XIV/1 pages 433–452, 756 Georg-Thieme-Verlag, Stuttgart, 1961. Particularly suitable auxiliaries of the type in question are, for example, hydroquinone and p-benzoquinone in concentrations of 0.01 to 0.05% by weight, respectively, based on components a and b.

Preferred sealing agents are waxes and, preferably, paraffins having a melting point of from 35° to 100° C. and preferably from 40° to 80° C. They are preferably added to the dispersions to be used in accordance with the invention in the form of aqueous dispersions and prevent inhibition of the polymerisation reaction by atmospheric oxygen. They are generally used in quantities of from 0.05 to 2% by weight, based on the aqueous dispersion.

The lacquer formulations containing added sealing agents normally require a ripening time of several hours before they can be hardened in the assembly lines provided for this purpose with their predetermined cycle times. However, the need for ripening can be completely eliminated by the addition of basic compounds, preferably amines and, more particularly, ammonia in quantities of from 0.03 to 1.0% by weight, based on the aqueous dispersion. In this case, the lacquers can be processed immediately.

Surprisingly, elimination of the need for ripening of the lacquer, coupled with an increase in reactivity, may also be obtained by the addition of an aliphatic or cycloaliphatic polyfunctional isocyanate, corresponding to a content of from 0.005 to 0.1 and preferably from 0.015 to 0.06 mole of NCO/100 g of polyester, to the polyester or polyester mixture immediately before dispersion. Aliphatic or cycloaliphatic polyisocyanates suitable for this purpose include hexamethylene diisocyanate, 2,2,4- and 2,4,4-trimethyl hexamethylene diisocyanate and their NCO-group-containing adducts with polyfunctional alcohols and water, isophorone diisocyanate and 4,4'-diisocyanatodicyclohexyl methane.

Thickeners, which are required above all in the case of thinly liquid oil-in-water emulsions for producing the necessary processing viscosity of the dispersions, are described in Karsten, Lackrohstofftabellen, 6th Edition, 1976, Paragraph 42.28 "Verdickungsmittel (Thickeners)". It is preferred to use cellulose derivatives, for example methyl cellulose, urethanebased thickeners and special montmorillonites. They may either be added to the polyester or polyester mixture or to the water before dispersion or, alternatively, may even be subsequently stirred into the final dispersion for post-thickening.

The dispersions may be prepared by stirring the water into the polyester or onto the mixture of polyesters a and b, for example by simple stirring or by means of a dissolver. In order to form a more finely divided dispersion, i.e. to enable the shear forces to be better introduced, it is advantageous to add water in portions at temperatures below 30° C. Both water-in-oil and also oil-in-water dispersions are formed.

The dispersion generally has a water content of from 20 to 70% weight, based on the dispersion.

Preferred accelerators are, for example, the heavy metal salts of carboxylic acids or the chelates of these metals, such as the acetates, naphthanates or acetyl acetonates of cobalt, cerium, manganese or vanadium. The accelerators may be added either in the form of aqueous solutions where they are soluble in water or in the form of aqueous dispersions.

Standard quantities, i.e. from 0.01 to 0.2% by weight of siccatibe metal, based on the polyester or on the mixture of polyesters a and b, generally ensure excellent hardening.

To protect light-sensitive substrates, for example light woods, it is possible to add to the coating compositions small quantities of the usual UV-absorbers, for example 2-hydroxy-4-methoxy benzophenone, or the cinnamic acid and benzotriazine derivatives normally used.

Standard additives and dyes, preservatives, matting agents, levelling agents and pigments may also be added to obtain special effects providing they do not significantly affect the stability of the emulsion and the polymerisation reaction.

The lacquers may be applied in conventional manner by roll coating, spray coating and casting (Wagner/Sarx, Lackkunstharze, 5th Edition, Carl Hanser Verlag, Stuttgart 1971, pages 140 and 141, and Weigel, Katalytische Lackhärtung und ihre Rohstoffe, Wissenschaftliche Verlagsgesellschaft, 1962, pages 192–202).

The process according to the invention is eminently suitable for use in conventional assembly lines through elimination of the pot life which normally limits the processing time or necessitates a separate application of peroxide (active primer process).

In the process according to the invention, the polyester dispersions are applied in layer thicknesses of from 10 to 250 $\mu$m and preferably in layer thicknesses of from 20 to 150 $\mu$m. Temperatures of generally from 20° to 150° C. and preferably from 40° to 100° C. are used for drying, i.e. to initiate the evaporation of water. The coatings are then hardened at the same temperature or at a higher temperature, i.e. at a temperature of from 20° C. to 180° C. and preferably at a temperature of from 40° to 160° C., until the coated articles can be stacked.

| Polyester a to be emulsified | Composition | (moles) |
|---|---|---|
| maleic acid anhydride | 1.0 | |
| 1,2-propane diol | 0.6 | |
| trimethylol propane diallyl ether | 0.95 | |
| acid number | 22 | |
| viscosity [mPa.s] at 20° C. | 18,000 | |
| emulsifier polyester b | $b_1$ | $b_2$ |
| maleic acid anhydride | 1.0 | 1.0 |
| polyethylene glycol (MW 400) | 0.79 | 0.86 |
| trimethylol propane diallyl ether | 0.4 | — |
| 2-ethyl-1-hexanol | — | 0.47 |
| acid number | 27 | 18 |
| viscosity [mPas.s], as measured on a 70% by weight solution in styrene at 20° C. | 560 | — |
| viscosity [mPas.s] at 20° C. | — | 3000 |
| Composition of the polyester mixture for the emulsions: | | |
| polyester mixture | 1 | 2 |
| polyester | | |
| a | 80 | 80 |
| $b_1$ | 20 | — |
| $b_2$ | — | 20 |

To prepare the dispersions, the polyester mixtures 1 and 2 were emulsified with water for a solids content of 70% by weight at temperatures of up to at most 40° C. using dissolvers rotating at 8000 r.p.m., followed by dilution with water to a solids content of 50% by weight at 1000 r.p.m. (particle size approximately 0.5 $\mu$m).

Sealing agent dispersion used in the lacquer Examples: 10 parts by weight of paraffin (MP 57°–60° C.) emulsified in 90 parts by weight of a 6% by weight aqueous polyvinyl alcohol solution (polyvinyl alcohol:

saponification number 140, viscosity 25 mPas, as measured on a 4% by weight aqueous solution at 20° C.).

The dispersions obtained were catalysed for comparison with and without peroxide (H$_2$O$_2$), siccativated with aqueous Co-acetate solution (Co-content approximately 5% by weight), case onto glass plates in a wet film thickness of approximately 80 μm after addition of the sealing agent and hardened in a drying tunnel at 50° C. (air speed 2 meters per second).

As shown in the following Table, the aqueous lacquer dispersions, both with (Examples 1 and 6) and also without peroxide (Examples 3, 4, 5, 8, 9, 10), harden in comparable times to form lacquer films having scratch-resistant surfaces. It is only the lacquer films which are free from sealing agent that have an adhesive-like feel despite their scratch resistance (Examples 3, 4, 8 and 9).

In view of its pot life of approximately 15 hours, the peroxidecontaining lacquer does not withstand the storage period of 24 hours without gelation. In the case of the lacquer free from peroxide, but not free from sealing agent the hardening process begins too slowly for technical application (Examples 2 and 7). However, this delay in hardening may be eliminated immediately with basic additives, for example, NH$_3$ (Examples 5 and 10).

| | Lacquer Examples | | | | | | | | | |
|---|---|---|---|---|---|---|---|---|---|---|
| | 1 | 2 | 3 | 4 | 5 | 6 | 7 | 8 | 9 | 10 |
| | | | | | parts by weight | | | | | |
| Emulsion of polyester mixture 1 | 100 | 100 | 100 | 100 | 100 | — | — | — | — | — |
| Emulsion of polyester mixture 2 | — | — | — | — | — | 100 | 100 | 100 | 100 | 100 |
| Sealing agent dispersion | 2 | 2 | — | — | 2 | 2 | 2 | — | — | 2 |
| Aqueous Co-acetate solution (Co-content 5% by weight) | 2 | 2 | 2 | 2 | 2 | 2 | 2 | 2 | 2 | 2 |
| H$_2$O$_2$ (35% by weight aqueous solution) | 3 | — | — | — | — | 3 | — | — | — | — |
| NH$_3$ (35% by weight aqueous solution) | — | — | — | 0.5 | 0.5 | — | — | — | 0.5 | 0.5 |

Lacquer films (wet film thickness 80 μm), dried at 50° C. in a drying tunnel
1. Lacquer coating after production
   Dry after   20mins.   5h.   35mins. 22mins. 20mins. 18mins.   4h.   37mins. 32mins.   33mins.
2. Lacquer coating after storage of the lacquer for 24 hours
   Dry after   5h.   30mins. 18mins. 18mins.   4h.   32mins. 29mins.   29mins.

We claim:
1. A process for the production of a thin-layer coating, characterized in that a monomer-free aqueous dispersion of at least one α,β-ethylenically unsaturated polyester containing from 0.2 to 0.8 mole of β,γ-ethylenically unsaturated ether groups per 100 g of polyester, is polymerized in the presence of an accelerator, but in the absence of a standard external polymerization initiator.

2. A process as claimed in claim 1, characterized in that the aqueous dispersion contains from 0.05 to 2% by weight, based on the aqueous dispersion, of a sealing agent.

3. A process as claimed in claim 2 characterized in that ripening time is avoided by the addition of from 0.03 to 1% by weight, based on the aqueous dispersion, of a basic compound.

4. A process as claimed in claim 1, characterized in that the aqueous dispersion additionally contains at least one member selected from the group consisting of polyfunctional aliphatic and cycloaliphatic isocyanates in an amount corresponding to from 0.005 to 0.1 mole of NCO per 100 g of polyester.

5. A process as claimed in claim 1, characterized in that a second polyester is used as dispersant so that the polyester component of the dispersion consists of
   a. from 50 to 95% by weight, based on the sum of a and b, of at least one α,β-ethylenically unsaturated polyester containing from 0.2 to 0.8 mole of β,γ-ethylenically unsaturated ether groups per 100 g of polyester a, but no co-condensing polyalkylene glycol residues having molecular weights of from 250 to 2000, and
   b. from 5 to 50% by weight, based on the sum of a and b, of at least one α,β-ethylenically unsaturated polyester of which from 25 to 90% by weight, based on b, consists of co-condensed polyalkylene glycol residues having a molecular weight of from 250 to 2000 and which contains from 0.16 to 0.5 mole of β,γ-ethylenically unsaturated ether groups per 100 g of polyester b.

6. A process as claimed in claim 1, characterized in that a second polyester is used as dispersant so that the polyester component of the dispersion consists of
   a. from 50 to 95% by weight, based on the sum of a and b, of at least one α,β-ethylenically unsaturated polyester containing from 0.2 to 0.8 mole of β,γ-ethylenically unsaturated ether groups per 100 g of polyester a, but no co-condensed polyalkylene glycol residues having a molecular weight of from 250 to 2000, and
   b. from 5 to 50% by weight, based on the sum of a and b, of at least one α,β-ethylenically unsaturated polyester of which from 25 to 90% by weight, based on b, consists of co-condensed polyalkylene glycol residues having a molecular weight of from 250 to 2000 and which contains per 100 g of polyester b from 0.02 to 0.2 mole of saturated aliphatic terminal groups formed by residues of at least one member selected from the group consisting of monocarboxylic acids and monofunctional alcohols.

* * * * *